US007795563B2

(12) United States Patent
Epstein et al.

(10) Patent No.: US 7,795,563 B2
(45) Date of Patent: Sep. 14, 2010

(54) METHOD FOR THE DESIGN OF 3-D RF-WELDING ELECTRODES

(75) Inventors: Adam S. Epstein, Wellesley, MA (US); Stephen J. Wiater, Southwick, MA (US); Richard S. Mongeau, Springfield, MA (US)

(73) Assignee: Dielectrics Industries, Inc., Chicopee, MA (US)

( * ) Notice: Subject to any disclaimer, the term of this patent is extended or adjusted under 35 U.S.C. 154(b) by 627 days.

(21) Appl. No.: 11/545,610

(22) Filed: Oct. 10, 2006

(65) Prior Publication Data

US 2007/0084861 A1 Apr. 19, 2007

Related U.S. Application Data

(60) Provisional application No. 60/724,948, filed on Oct. 7, 2005.

(51) Int. Cl.
*H05B 6/54* (2006.01)
*B23K 11/06* (2006.01)
*G06F 19/00* (2006.01)

(52) U.S. Cl. .......................... 219/780; 219/83; 219/84; 700/97; 700/98; 700/182

(58) Field of Classification Search ................. 219/780, 219/765, 83, 84; 700/97, 98, 182
See application file for complete search history.

(56) References Cited

U.S. PATENT DOCUMENTS 4,258,425 A * 3/1981 Ramsey et al. .............. 700/248
5,818,005 A * 10/1998 Pratt et al. ............... 219/69.15
6,627,835 B1 * 9/2003 Chung et al. ............. 219/69.12

* cited by examiner

*Primary Examiner*—Tu B Hoang
*Assistant Examiner*—Ayub Maye
(74) *Attorney, Agent, or Firm*—Cantor Colburn LLP

(57) ABSTRACT

A technique for the design of 3-D RF welding electrodes by first modeling the surface of the welded part perimeter as a spline in a 3-D CAD program, and then dividing the spline up into multiple, small straight segments. The straight segments are offset simultaneously in opposite directions from the spline, to form two sets of straight segments, each set being equidistant from the spline, with the gap between the two sets equal to the target thickness of the welded package. New die faces are constructed from each of the sets using smoothing techniques, and 3-D models of the die faces are manufactured to check accuracy of the design, making sure that all the corresponding points of the pair of electrodes are equidistant, thereby creating a strong weld with good cosmetic results all along the parts being joined.

6 Claims, 1 Drawing Sheet

METHOD FOR THE DESIGN OF 3-D RF-WELDING ELECTRODES

CROSS-REFERENCE TO RELATED APPLICATIONS

This application claims the benefit of U.S. provisional patent application 60/724,948 filed on Oct. 7, 2005, the entire contents of which of incorporated herein by reference.

FIELD OF THE INVENTION

This invention relates to radio-frequency (RF) welding, also known as dielectric welding or high-frequency welding, and relates more specifically to a technique for designing electrodes for three-dimensional (3-D) RF welding.

BACKGROUND

RF welding is a process that relies on internal heat generation by dielectric hysteresis losses of thermoplastics. Under a high-frequency electric field, a polar polymer undergoes a dipole polarization process forming strong dipoles. These dipoles tend to orient in the direction of the field being applied and try to continually align with the rapidly reversing, high-frequency electric field. Because of the bulky polymer chains and chain entanglement, the attempted alignment causes internal molecular friction and results in heat generation. The heat melts the surfaces of the two parts being joined and increases the polymer mobility of these surfaces. Ultimately, the polymer chains diffuse through the interface of these parts and become entangled to form a strong weld.

RF welding has traditionally been used to weld two flat-die extruded thermoplastic films together. This was accomplished by directing a powerful high-frequency wave through a shaped electrode that was made from bent extruded bars or machined brass. This generally produced flat, two-dimensional (2-D) shapes, such as an IV bag. Some additional shapes, such as welding half-circles around tubes, is also common, but not easy. The only way to affect shapes in three dimensions was to weld them in a flat, 2-D shape, and then pull them into 3-D by filling them or putting them through additional operations. This limited the application of RF welding to simpler constructions.

Typical RF welding equipment comprises three major components: 1) an RF generator; 2) a press; and 3) a set of dies, or electrodes. The generator commonly provides power ranging from 1 to 25 kW, depending on the welding area, part thickness, and the dielectric properties of the material being welded. Solid-state rectifiers in the power supply convert incoming alternating current into high-voltage direct current, followed by an oscillator converting high-voltage direct current into high voltage alternating current. The frequencies used for RF welding range from 13 to 100 MHz, but mot typically 27.12 MHz.

The press, usually a pneumatic press, consists of one fixed, lower platen and one movable, upper platen. During the welding process, the press moves the upper platen down and applies force onto respective sections of two parts to be joined which lie between the platens. Pressure is maintained during a hold cycle. There is usually a pressure regulator which determines the maximum force applied to the press.

The set of dies, or electrodes, include an upper fixture and a lower fixture. In the simplest tools, the upper fixture is a raised projection of metal that matches the geometry of the parts being welded and the lower fixture is a flat metal plate. This type of fixture is easy to fabricate and maintain, but this has two main disadvantages: 1) fringing of the electric field that produces melting beyond the upper electrode area; 2) the application whose parts are being welded must be able to accommodate a flat lower fixture.

In applications where cosmetics are important and/or the application shapes do not allow for a flat lower fixture, the lower fixture may also have a raised electrode protrusion, thereby allowing parts with tall dimensions to be welded. This type of fixture defines the electric field better and produces less fringing, and thus results in a more defined weld area, as compared to a flat lower fixture. However, alignment of the upper and lower fixtures is critical.

In automated systems, the lower fixture can translate the part in and out of the machine with a rotary station or with a slide shuttle table. The upper fixture, with a particular contour for the application, is attached to the moveable, upper platen of the press. The fixture supports the electrode that is used to apply the electric field and localized clamp force to assure proper welding. The electrodes are typically fabricated from 2 to 4 mm thick copper, bronze, or brass sheet metal.

In fabricating a fixture, it is possible to machine the raised electrode from a solid plate of metal, however it is more common to bend the electrodes from a standard electrode profile. Commercially available profiles are usually made of brass or copper to maximize electrical and thermal conductivity. In addition, these materials are easy to machine. The profiles are pre-drilled to facilitate attachment to the lower plate and offer various surface finishes, such as flat, knurled, cut and seal profile, and stitched. It is worthwhile to note that, while many of the profiles have complex geometry, they do not have any sharp points that can concentrate the electric field and promote arcing or localized heating.

It is also common for the lower fixture (flat plate portion) to be covered with a non-stick, high-dielectric film, typically made of release paper, KAPTON® films, and TEFLON® films to help release the parts from the fixture, increase equipment efficiency and power delivery.

In applications that have high duty cycles or high production rates, the fixture can be water-cooled to prevent heat build-up and to minimize cycle times. When welding crystalline materials, which have a relatively distinctive melting, or processing, temperature, the fixtures are sometimes slightly heated with an electrical heater to minimize cycle times.

Applied voltage, electrode separation, and the localized clamp pressure are three critical process parameters for RF welding which must be taken into account in order to make welds that are strong and uniform. The greater the voltage, the higher the intensity of the electric field, and a correspondingly faster welding process. However, high voltage has the potential to break down the material. The appropriate voltage should be determined based on the electrode separation, and on the dielectric constant and break down of the material being welded. Heat generation is inversely proportional to the square of the electrode separation. Therefore, if the joint is too thick, the welding will not be effective. The typical thicknesses for RF welding are from 0.50 mm to 1.90 mm. The clamp pressure not only affects the electrode separation, but also facilitates melting and welding. Over-clamping, however, causes flashing or melt break down. As a result, any change in these parameters causes significant changes in welding properties. Keeping the conditions the same at all the locations of the area being welded is the key to producing uniform welds. Because the process is very sensitive to these conditions, RF welding processes are generally suitable for flat thin films or sheets, such as medical disposable bags, blister packs, and book/cassette covers.

In most applications, RF welding is utilized for sealing thin and flat parts. In some cases, however, parts to be welded may not be flat, such as in an inflatable CPAP (continuous positive airway pressure) mask interface. In this case, if the part was designed using typical RF welding standards, a flat part could be produced, whose perimeter would be made from the lay-flat dimensions. Lay-flat dimensions can be modeled by taking the 3-D shape of the finished product, and pushing them into a flat plane. However, since the component only functions in 3-D, the resulting part would need to be folded or inflated from the flat form in which it was welded into the desired 3-D shape. Since the component is made from normally flat films, when they are pulled or folded into 3-D, the film will naturally wrinkle, and produce an uneven surface. In the case of the CPAP mask, this would result in non-functional parts.

There is a need for a technique which can enable 3-D electrodes for use in RF welding processes to be manufactured and that will still follow RF tooling design standards, enabling 3-D parts to be welded with the material compressed under a constant pressure at all points along the weld, thereby producing welds with excellent strength and good cosmetic results.

SUMMARY OF THE INVENTION

An embodiment of the method of the invention provides a technique for the design of 3-D RF welding electrodes by first modeling the surface of the welded part perimeter as a spline in a 3-D CAD program, and then dividing the spline up into multiple, small straight segments. The straight segments are offset simultaneously in opposite directions from the spline, to form two sets of straight segments, each set being equidistant from the spline, with the gap between the two sets equal to the target thickness of the welded package. New die faces are constructed from each of the sets using smoothing techniques, and 3-D models of the die faces are manufactured to check accuracy of the design, making sure that all the corresponding points of the pair of electrodes are equidistant, thereby creating a strong weld with good cosmetic results all along the parts being joined.

BRIEF DESCRIPTION OF THE DRAWINGS

In the drawings, in which like reference numerals indicate corresponding parts in all views.

DESCRIPTION OF THE PREFERRED EMBODIMENTS

Figure 1:
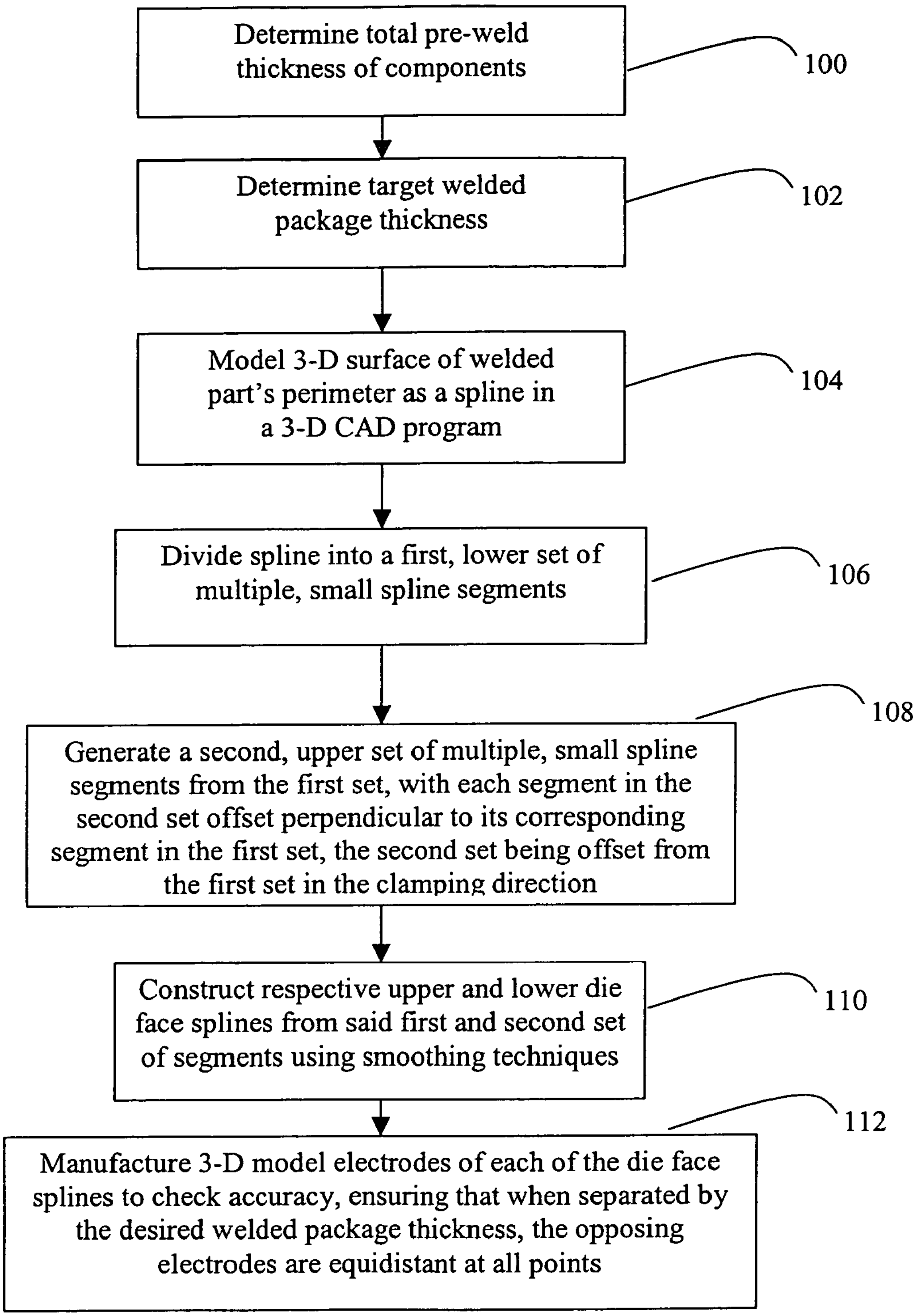
FIG. 1 is a flow chart showing the steps in the method of designing 3-D welding electrodes.

A description of the preferred embodiments of the present invention will now be had by way of example, and not limitation, with reference to the flowchart illustrated in FIG. 1.

Before the design for a 3-D electrode is started, two data points must be determined: the total package thickness of the films/components (pre-weld) at 100, and the resulting target welded package thickness at 102. In most flat applications, the best welding results are usually obtained from two films that have the same original thickness. In that way, the concentration of RF energy will occur in the middle of the material package, which is where the materials meet. This is the weld target. For example, if the total material package, pre-weld, is 0.50 mm, the RF energy will tend to focus at 0.25 mm into the package during the weld cycle, and then radiate outward through the materials. Depending upon the selection of the materials used, the target welded package thickness may be 0.36 mm. These dimensions are then used in designing the die face.

As the die is closing down to the target welded package thickness during the weld cycle, the focus of the RF energy will move through the materials. It is important that the machine is adjusted using the correct combination of settings to ensure that the two material faces receive a requisite amount of energy to produce a reliable weld.

In order to convert 3-D shapes into 2-D weldable structures, we adopted a "Finite Element Analysis (FEA)" principle that is used for modeling complex curves. First the 3-D surface of the welded part's perimeter is modeled as a spline in a 3-D CAD (Computer Aided Design) package at 104. Next, the spline is divided up into a first, upper set of multiple, small, straight spline segments at 106. From these CAD model segments a second, lower set of small straight spline segments is created, each small straight spline segment in the second set being offset perpendicular to its corresponding small straight spline segment in the first set, the second set being offset in the clamping direction to a distance equivalent to the thickness of the welded package (which is 0.36 mm in the example above) at 108.

Spacing between the upper electrode and the lower electrode are critical because that will, in part, determine how much compression each section of the welded material will experience during the weld cycle. Too much compression will force the molten material away from the die face and produce excess extrusion. Too little compression could result in unwelded sections because the molten materials of the two parts being welded will not mix properly during the weld cycle.

When these small straight spline segments are offset, they are offset in a perpendicular direction. This is to say, the die face is not offset using the "offset" command found in most CAD programs. If this occurs, the spacing between die faces will be uneven as the spline moves out of plane and the plastic clamped between them will see uneven pressure during the weld cycle, producing both over-welded and under-welded sections over the length of the weld face.

Once the small straight spline segments are offset, an upper and a lower die face spline should be constructed using known smoothing techniques at 110. When the offset procedure is complete, the two die faces will be complete. To check accuracy, the die face splines should be modeled in 3-D space as a pair of die face electrodes, separated by the distance of the desired welded package thickness (0.36 mm in our example). This will show what the mating tools look like in the closed position. The spacing between the die face electrodes is then checked to ensure that they are equidistant at all points when the press clamp stops are set at the final welded package thickness at 112.

When the material package is clamped in the device, the upper and lower electrodes will have uneven spacing between them. Once the RF power is applied and the material between the electrodes turns molten, the die will close down to the target thickness, with an equal distance over the whole weld. The machine should be set with fixed stops so that the die faces never get closer than the target weld thickness.

This tool design technique does have some limitations, however. As mentioned above, it is critical to maintain a constant pressure on all sections of the clamped material. Since the tool can only be opened in one direction (the clamping direction), particular attention must be paid to the geometries, such that the orientation of the parts to be welded doesn't cause two vertical surfaces of the parts to be welded to slide relative to each other. The more vertical the surface, the greater the risk of the material sheering while the die faces move into position during the weld cycle, and of those stresses being frozen into the material once it cools. As a rule of thumb, surfaces should be kept as horizontal as possible in relation to a vertical clamping axis, and usually no more than 30° off-plane.

In summary, while historically, most RF tools are designed in the flat, this has inherent disadvantages in that when the 2-D parts are pulled into 3-D space, undesirable results may occur, like kinking, creasing, and weakening of the parts. However, with the present techniques, a wider range of geometries can be created in a single step. With the aid of 3-D CAD programs, and by borrowing techniques used for FEA analysis, mating die faces can be designed that still follow RF tooling design standards. The 3-D tools, by design, compress the material to be welded under a constant pressure and allow for excellent weld strengths and good cosmetic results.

While this invention has been described with reference to one or more embodiments, it will be understood by those skilled in the art that various changes may be made and equivalents may be substituted for elements thereof without departing from the spirit or scope of this invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention.

What is claimed is:

1. A method of designing and manufacturing a mating pair of electrodes for 3-D welding for welding components together to form and to manufacture a final welded product, said method comprising:

determining a total pre-weld thickness of components to be welded;

determining a target welded package thickness, the target welded package thickness being a thickness of the components when they are welded to form a final welded product;

modeling a 3-D surface of the perimeter of the final welded product as a spline in a 3-D computer aided design program;

using the spline to generate a lower die face spline and an upper die face spline; and manufacturing a pair of physical 3 D electrodes from each of said upper and lower die face splines, respectively; the pair of physical 3-D electrodes having an upper electrode based on the upper die face spline and a lower electrode based on the lower die face spline;

using the physical 3-D electrodes to manufacture the final welded product front the components to be welded;

wherein using the spline to generate a lower die face spline and an upper die face spline includes:

dividing the spline into a first, lower set of multiple, small spline segments; and generating a second, upper set of multiple, small spline segments from the first set, with each segment in the second set offset perpendicular to its corresponding segment in the first set, the second set being offset from the first set in a clamping direction, the clamping direction corresponding to the direction in which a tool containing the physical 3-D electrodes is opened.

2. The method of claim 1, further comprising using said first and second sets of multiple, small spline segments and constructing said upper and lower die face splines therefrom using smoothing techniques.

3. The method of claim 1, further comprising separating said respective 3-D model electrodes by a first distance, said first distance equal to said target welded package thickness, and ensuring that when separated by the first distance the opposing electrodes are equidistant at all points.

4. The method of claim 1, wherein said manufacturing a pair of 3-D model electrodes includes using standard, commercially available electrode profiles.

5. The method of claim 1, wherein said manufacturing a pair of 3-D model electrodes includes making the electrodes out of brass.

6. The method of claim 1, wherein said manufacturing a pair of 3-D model electrodes includes making the electrodes out of copper.

* * * * *